No. 670,387. Patented Mar. 19, 1901.
C. H. HOWLAND-SHERMAN.
GEAR.
(Application filed June 28, 1900.)
(No Model.) 2 Sheets—Sheet 1.
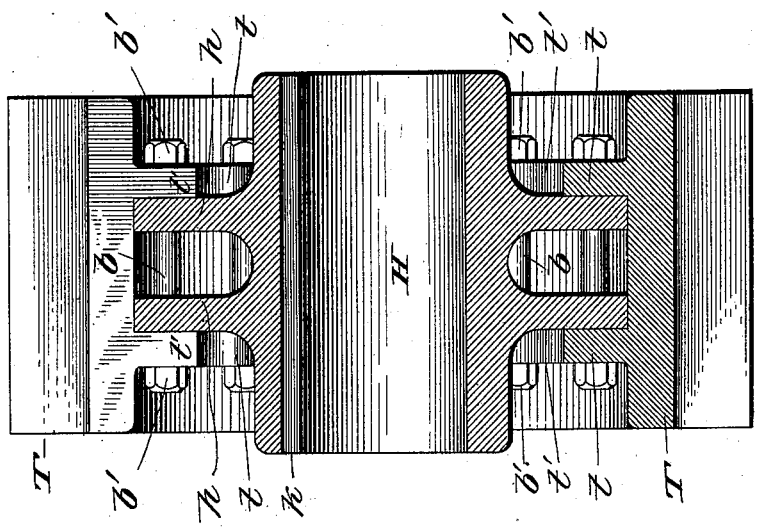
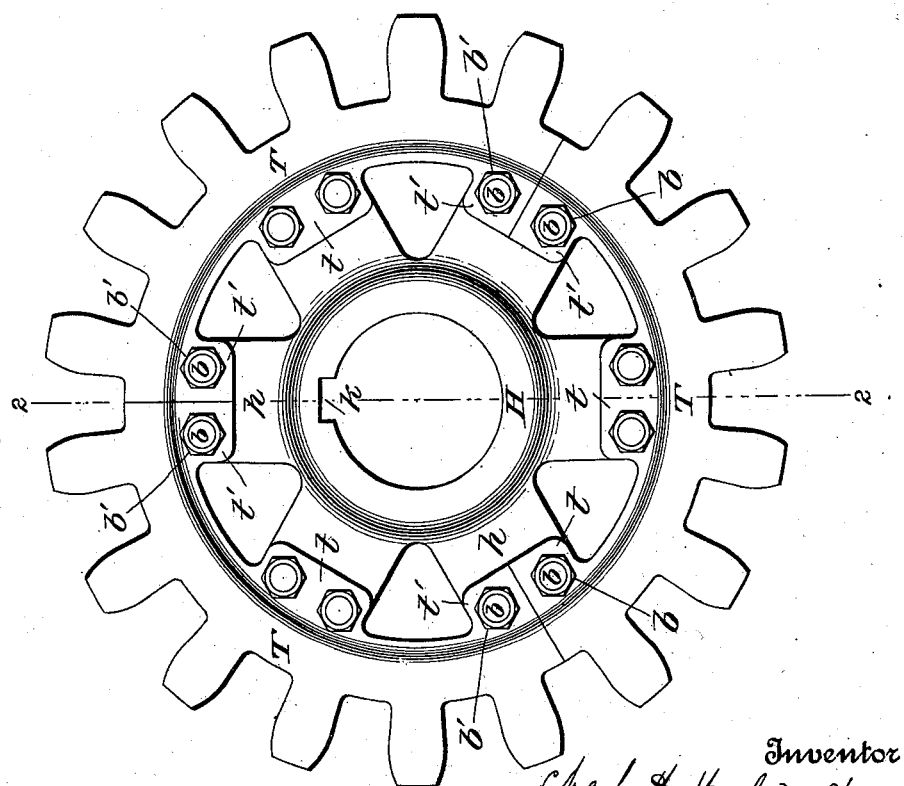
Witnesses
G. S. Elliott.
C. B. Bull.
Inventor
Charles H. Howland-Sherman,
by Attorneys.

No. 670,387. Patented Mar. 19, 1901.
C. H. HOWLAND-SHERMAN.
GEAR.
(Application filed June 28, 1900.)
(No Model.) 2 Sheets—Sheet 2.
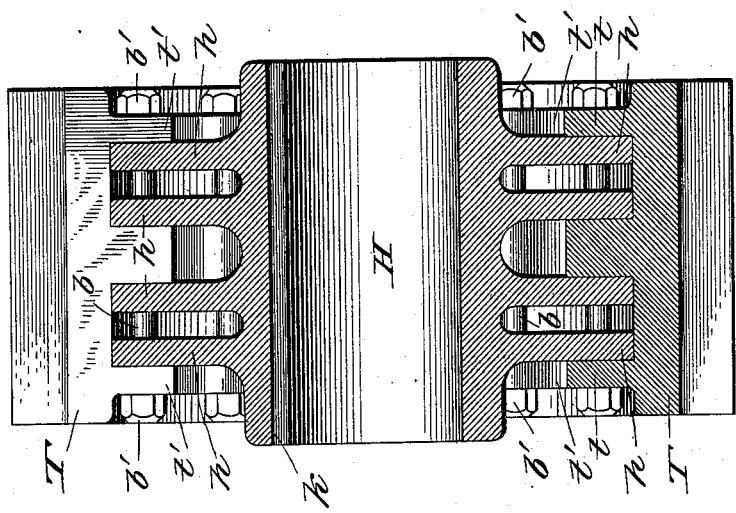
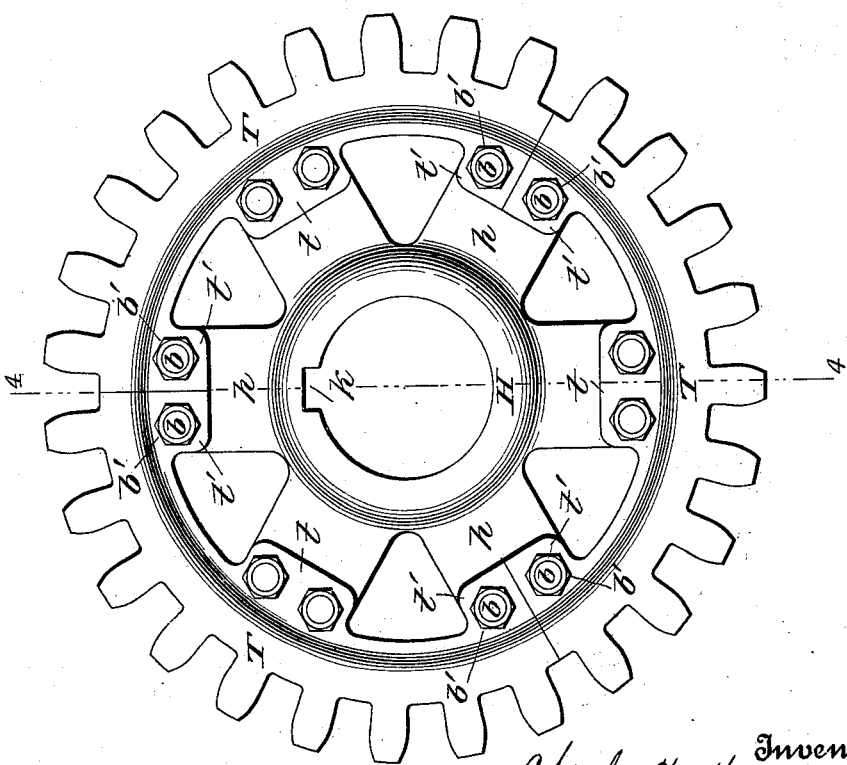
Witnesses
G. S. Elliott.
C. B. Bull.
Inventor
Charles H. Howland-Sherman,
by his Attorneys

UNITED STATES PATENT OFFICE.

CHARLES H. HOWLAND-SHERMAN, OF PATHFINDER, DISTRICT OF COLUMBIA, ASSIGNOR OF ONE-FOURTH TO GEORGE H. HOWARD, OF WASHINGTON, DISTRICT OF COLUMBIA, AND SAMUEL G. B. COOK, OF LONDON, ENGLAND.

GEAR.

SPECIFICATION forming part of Letters Patent No. 670,387, dated March 19, 1901.

Application filed June 28, 1900. Serial No. 21,957. (No model.)

*To all whom it may concern:*

Be it known that I, CHARLES H. HOWLAND-SHERMAN, a citizen of the United States, residing at Pathfinder, in the District of Columbia, have invented a new and useful Improvement in Gears, of which the following is a specification, reference being had to the accompanying drawings and to the letters of reference marked thereon.

My invention relates to assembled gears, and is designed as such an improvement in the construction of gears of this class as shall render them non-explosive under relatively higher speeds than might be attainable in single-piece gears of crystalline material—such as cast-iron, &c.—whose internal tension or stress is admitted to be an unknown quantity.

The advantages of my invention, viewed as to its strength-giving qualities independently of its mechanical merits, are that the hub and gears are respectively cast as separate bodies, each of which thus affords an opportunity for perfectly uniform cooling and a uniform intermolecular tension of its material upon cooling, such as would be unattainable were the tooth-segments cast in one piece with the arms and hub.

Mechanically the advantages of my invention are that it enables the hub and the tooth-segments to be independently finished for each other, insuring greater accuracy for both, especially as regards cutting the teeth. This gear is particularly adapted to transmitting large horse-powers when subject to unusual wear, such as those of rolling-mills, rock-crushers, &c., where it is frequently necessary to throw away entire gears made as one-piece castings by reason of the wear or breakage of a single tooth.

My invention is also especially useful in that even more numerous class of gears where the pinion is the delivering member of speed-trains, and its excessive duty of transforming from the low to the high speed occasionally results in the bursting of such cast members. Accidents such as the above breakage of teeth or explosion of pinions are not uncommon in the operation of heavy or high-speed machinery, and this invention is designed to afford means of substantial security from explosion and of quickly replacing the worn tooth-segments of gears whose hubs have practically indefinite wear. I accomplish these objects by the mechanism illustrated in the accompanying drawings, hereby made a part of this specification, in which—

Figure 1 is a side elevation of my preferred form of non-explosive gear, showing the tooth-segments assembled by their bolts upon a hub to form the complete gear. Fig. 2 is a section on the line 2 2 of Fig. 1, showing the manner in which the flanges of the tooth-segments exteriorly inclose and are by their bolts assembled to the duplex arms of the hub. Fig. 3 is a side elevation of a modified form of my invention, showing the tooth-segments assembled to the hub, forming the complete gear in a manner similar to Fig. 1. Fig. 4 is a section on the line 4 4 of Fig. 3, showing the manner in which the flanges of the tooth-segments interiorly and exteriorly engage the peculiar quadruplex arms of the hub.

Similar letters of reference indicate similar parts throughout the several views.

The hub H has a keyway $k$ for engagement by any suitable key to the shaft. Arms $h$, preferably made as duplex or quadruplex radial flanges of the character more particularly shown in Figs. 2 and 4, are formed integrally with the hub H. The preferred construction herein indicated of these arms as simple radial flanges tends to importantly strengthen the hub itself, which is therefore considerably reduced in thickness and in weight, while the combined structure weighs less than if the usual thicker one-piece arm were integrally cast to a thicker hub and made to give direct tensional support to the pull of the rim. In other words, the multiple arm has equal strength to a solid arm of a thickness equal to the total depth of each laterally-registering flange-set and is lighter than such a solid arm. It is also evident that all of the arms $h$ can be united by webs into either single or multiple flanges running continuously around the hub; but as no strength would be gained and weight of material lost such construction is not recommended.

The number of hub-arms $h$ is preferably six, as this number allows the convenient assembly thereto of trifurcated tooth-segments, such as are illustrated in Figs. 1 and 3, upon average-sized gears.

The tooth-segments T are assembled to the arms $h$ by the central flanges $t$ and end flanges $t'$, the two latter being secured to the arms by bolts $b$, as clearly shown in all the views, the assembling-faces of the successive gear-segments being the radial surfaces at the ends of the segments T. The bolts $b$ form tight fits in their registering borings, both through the flanges $t\ t'$ and the arms $h$, so that when they are drawn rigidly into position by the nuts $b'$ no play of the tooth-segment T is possible either angularly, radially, or in any other direction with respect to the hub H or its arms $h$.

The hub H should preferably be made of some readily-worked material, like cast-iron. It is, as above indicated, cast integrally with the arms $h$, whether the latter be single, duplex, or quadruplex. When cast, the hub is interiorly bored or turned to fit its shaft, and the arms $h$ are exteriorly cleaned off on the lathe to interiorly fit the flanges $t\ t'$ and are circumferentially turned to fit the bottom of the tooth-segments. Similarly the tooth-segments are separately cast and interiorly turned to a proper radius to exteriorly engage the arms $h$. Borings are made for the bolts $b'$ and said bolts inserted and drawn to the position shown by their nuts $b'$, completing the gear. This shop practice of building a composite gear is very inexpensive, but furnishes parts whose separate molding and accurate assembly present the best possible working results. The manufacturing operations concerned are limited strictly to molding, boring, and turning, representing a gear wholly free from the requirement for hand-finishing.

The operative functions of my invention are simple: First, the flanges $t\ t'$ of the tooth-segments T absorb the combined single shears of all the bolts $b$ in rotarily transmitting power to or from the gear; second, the bursting moment developed by the centrifugal forces present in operating the gear, as well as any other disintegrating tendencies due to the mass inertia of the tooth-segments at high speeds, is fully resisted by the double or quadruple shear of the same bolts $b$, and, third, the tooth-segment sustains the bending moment to which it is subjected in broad-faced pinions of this kind after the manner of a bridge structure, referring the stress to points where it is absorbed by means of the crushing resistance of the arms $h$, as clearly shown in Figs. 2 and 4, while the flanges $t\ t'$ conversely strengthen the tooth-segments to resist the bending moment due to any inequality of the teeth themselves. It is clear that this arrangement, therefore, tends to preserve the correct contours of fine teeth—such as those of epicycloidal type, &c.—during a longer life than might be practicable under a solid cast condition.

The common form of my invention shown in Figs. 1 and 2 is designed particularly for use in relatively slow speed machinery, transmitting heavy strains of uniform character, or for use where the pinion actuates the wheel, as in many large wharf-cranes, quarry-derricks, &c., where its construction affords the advantage of ready replacement of broken teeth. The form shown in Figs. 3 and 4 is adapted to speed-trains having less uniform strains of lighter quality, but developing considerable bursting moments. This assembled system of gear is equally adapted to both cut and molded wheels of any of the customary materials, such as steel, cast-iron, &c.

I do not wish to restrict myself to the special construction of my invention exemplified in the accompanying drawings, preferring to reserve the right to legitimately vary that structure without violating the spirit of my invention.

Having thus described the construction of my gear and indicated its operation, what I claim is the following:

1. Combined in a wheel structure, a hub having integral therewith symmetrically-arranged radial arms, separable solid-faced tooth-segments, each having flanges adapted to engage said arms and joining radially and centrally over certain of said arms, and means adapted to fix said solid-faced tooth-segments to said arms, substantially as set forth.

2. Combined in a wheel structure, a hub having integral therewith symmetrically-arranged radial arms, separable solid-faced tooth-segments, each having flanges adapted to engage said arms and joining radially and centrally over certain of said arms, and bolts adapted to rigidly fix said solid-faced tooth-segments to said arms, substantially as set forth.

3. Combined in a wheel structure, a hub having integral therewith symmetrically-arranged radial arms, separable solid-faced tooth-segments, each having integral flanges adapted to engage said arms and joining radially over certain of said arms, and bolts adapted to rigidly fix, rotarily and radially, the said solid-faced tooth-segments to said arms in such manner as to prevent relative motion between said segments and said arms, substantially as set forth.

4. Combined in a wheel structure, a hub formed with radial flanges adapted to serve as arms, solid-faced tooth-segments joined along their abutting faces, radially over the arms or flanges and adapted to engage said radial flanges, and bolts passing through the flanges and the tooth-segments, substantially as set forth.

5. Combined in a wheel structure, a hub having integrally-formed and symmetrically-arranged radial flanges adapted to serve as arms, solid-faced tooth-segments whose bases are adapted to fit over said radial flanges, the abutting faces of said segments joining radially and centrally over certain of said radial flanges, and bolts passing through the flanges and tooth-segments, substantially as set forth.

6. Combined in a wheel structure, a hub having integral therewith symmetrically-arranged radial arms, said arms being duplicated or in series, separable solid-faced tooth-segments, each having flanges adapted to engage said arms, and joining radially and centrally over certain of said arms, and means adapted to fix said solid-faced tooth-segments to said arms, substantially as set forth.

In testimony whereof I have hereunto set my hand and seal.

CHARLES H. HOWLAND-SHERMAN. [L. S.]

Witnesses:
GEORGE H. HOWARD,
C. B. BULL.